(12) United States Patent
Ludwig et al.

(10) Patent No.: US 9,407,675 B1
(45) Date of Patent: Aug. 2, 2016

(54) ROOM CLOUD ENVIRONMENT FOR CONFERENCING

(71) Applicants: John Ludwig, Bellevue, WA (US); Richard Tong, Seattle, WA (US); John Zagula, Seattle, WA (US); Jon Anderson, Lake Forest Park, WA (US)

(72) Inventors: John Ludwig, Bellevue, WA (US); Richard Tong, Seattle, WA (US); John Zagula, Seattle, WA (US); Jon Anderson, Lake Forest Park, WA (US)

(73) Assignee: Surround.IO, Seattle, WA (US)

( * ) Notice: Subject to any disclaimer, the term of this patent is extended or adjusted under 35 U.S.C. 154(b) by 0 days.

(21) Appl. No.: 14/744,001

(22) Filed: Jun. 18, 2015

Related U.S. Application Data

(60) Provisional application No. 62/013,623, filed on Jun. 18, 2014.

(51) Int. Cl.
   *H04N 7/15* (2006.01)
   *H04L 29/06* (2006.01)

(52) U.S. Cl.
   CPC ............... *H04L 65/403* (2013.01); *H04N 7/15* (2013.01)

(58) Field of Classification Search
   CPC ........... H04N 7/15; H04N 7/152; H04N 7/14; H04N 7/142
   USPC ............................................ 348/14.01–14.16
   See application file for complete search history.

(56) References Cited

U.S. PATENT DOCUMENTS

| | | | | |
|---|---|---|---|---|
| 2011/0157451 A1* | 6/2011 | Chang | ..................... | H04N 5/332 348/336 |
| 2013/0188007 A1* | 7/2013 | Duong | ..................... | H04N 7/15 348/14.08 |
| 2014/0139426 A1* | 5/2014 | Kryze | ..................... | G06F 3/011 345/156 |

* cited by examiner

*Primary Examiner* — Melur Ramakrishnaiah
(74) *Attorney, Agent, or Firm* — FSP LLC

(57) ABSTRACT

A room conferencing system includes a hub with a plurality of sensor nodes, each sensor node including a sensor node camera and a sensor node processor. A master controller is operable to establish a plurality of named queues, each of the named queues associated with a proximate physical object in an area comprising the hub and detectable by the sensor node camera. Each sensor node operable to cause the sensor node processor to identify a viewed physical object in a feed from the sensor node camera, and associate the viewed physical object with one of the named queues.

7 Claims, 8 Drawing Sheets

ROOM CLOUD ENVIRONMENT FOR CONFERENCING

CROSS-REFERENCE TO RELATED APPLICATIONS

This application claims priority and benefit under 35 u.s.c. 119 to U.S. application Ser. No. 62/013,623, filed on Jun. 18, 2014, which is incorporated herein by reference in its entirety.

BACKGROUND

Today, you can either have high scale and robustness in an enterprise cloud computing or you can have massive sensor data and location information in a handheld device. But, no system combines the best of Internet-scale cloud computing with the sensor rich mobile devices that live in the millions of rooms in every office building and in every home. If such a system existed it would dramatically improve the management of these systems, the security and enable a large class of room-focused applications.

BRIEF SUMMARY

In some embodiments, a room conferencing system may include a hub, a master controller operable to establish a group of named queues, and/or each sensor node. The hub may include a group of sensor nodes, each sensor node may include a sensor node camera and a sensor node processor.

In some embodiments, each of the named queues is associated with a proximate physical object in an area that includes the hub and which is detectable by the sensor node camera.

In some embodiments, the room conferencing system includes logic to identify a viewed physical object in a feed from the sensor node camera. In some embodiments, the system may associate the viewed physical object with one of the named queues.

In some embodiments, such a room conferencing system may further include the master controller operable to establish a master queue. This master queue may include a description of the proximate physical object.

In some embodiments, such a room conferencing system may further include the group of sensor nodes arranged in a group of rings around a perimeter of the hub.

In some embodiments, each ring may include exactly four sensor nodes.

In some embodiments, each ring may include exactly eight sensor nodes.

The sensors in one particular ring may be both vertically and horizontally offset from sensors in a ring immediately above the particular ring.

In some embodiments, the sensors in one particular ring may be both vertically and horizontally offset from sensors in a ring immediately above the particular ring and sensors in a ring immediately below the particular ring.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Embodiments of a device system are disclosed that utilizes architectural features of Internet-scale cloud computing on a mobile-oriented, sensor-rich environment in a single room of the home or office. The system applies Internet-scale robustness at the hardware level so that individual components in a room cloud device may fail and spare processors can take over. It constantly checks itself and ensures that when a hardware device fails or software fails it recovers without user intervention. The system utilizes bus interconnects and failure-over systems that is much less expensive than data center systems yet offers data center advantages that mobile and small computers lack today.

The system may utilize public key encryption schemes, fault tolerance, re-configurability, and administration applied to mobile devices and computers at the room scale (a "room cloud"). The system manages new devices entering and leaving the "room cloud". The system manipulates real-time sensor data and communicates it in a reliable way enabling map/reduce and parallel computing applications. The system utilizes reliable message queues rather than publishing to a URL or relying on flat tables, and executes on a private network with high consistency and redundancy.

Some embodiments utilize a map/reduce paradigm modified for small-scale networks. Rather than fixed nodes that have roles, every processor in the room cloud may participate in any map/reduce operation. For example if a camera element isn't committed with capturing video, it may be utilized to assist with post-processing data from other sensors. At the applications level, a new class of application is enabled because the entire "room" may be programmed. Computation is distributed. When intensive image processing is required, the operating system identifies one or more GPU element and allocates the processing accordingly. If two sensors are measuring or recording the same object, their outputs may be correlated.

DRAWINGS

Figure 1:
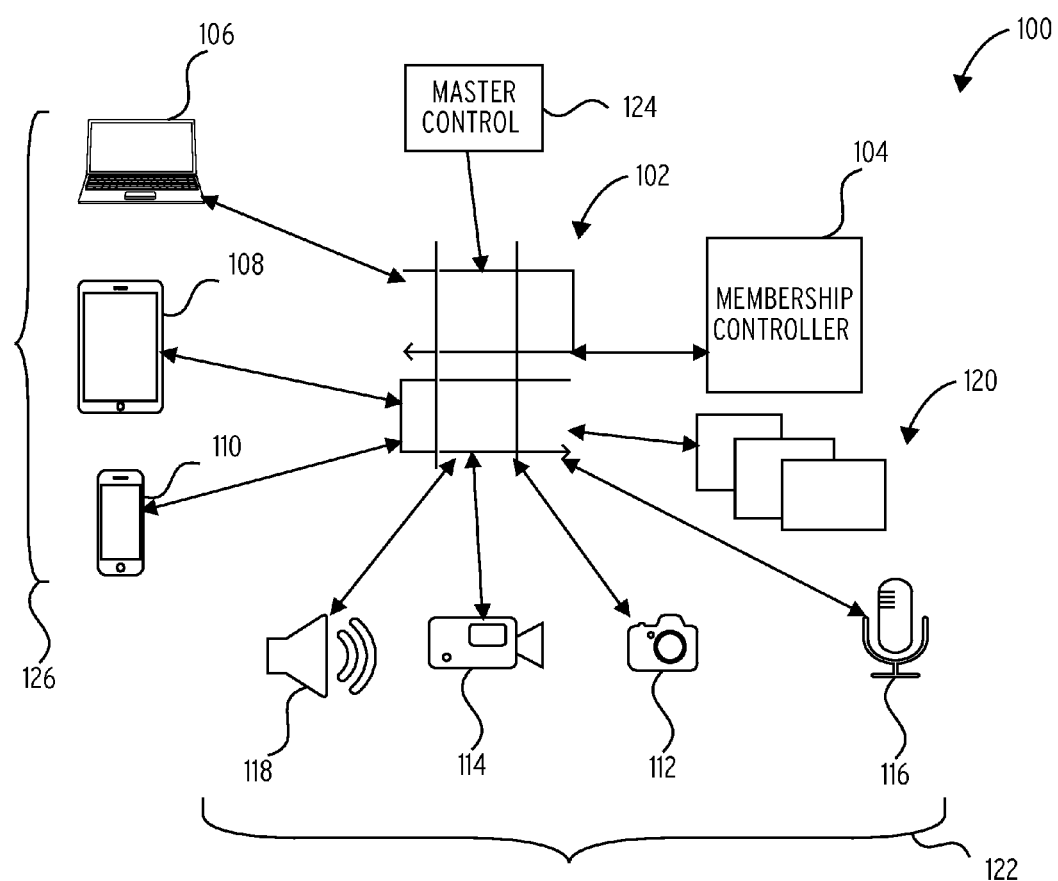
FIG. 1 illustrates an embodiment of a room cloud system 100.

FIG. 1 illustrates an embodiment of a room cloud system 100. The room cloud system 100 comprises an intelligent bus fabric 102, a master control 124, a membership controller 104, various sensors and transducers 122 (e.g., speaker 118, video camera 114, still frame camera 112, and microphone 116), and a GPU pool 120.

Various mobile devices (e.g., mobile computer 106, tablet device 108, and mobile phone 110) interface on a temporary basis with the room cloud system 100 and communicate with one another and with the system's sensors and transducers 122 via the bus fabric 102. Under control of the master control 124 the GPU pool 120 processes measurements and recorded data from the sensors and transducers 122 using secure message queues. Some elements of the GPU pool 120 may be distributed among the sensors and transducers 122. The GPU pool 120 may operate semi-autonomously from the master control 124.

The membership controller 104 authenticates, joins, and un-joins various end user devices 126 that enter and leave the room cloud system 100.

Figure 2:
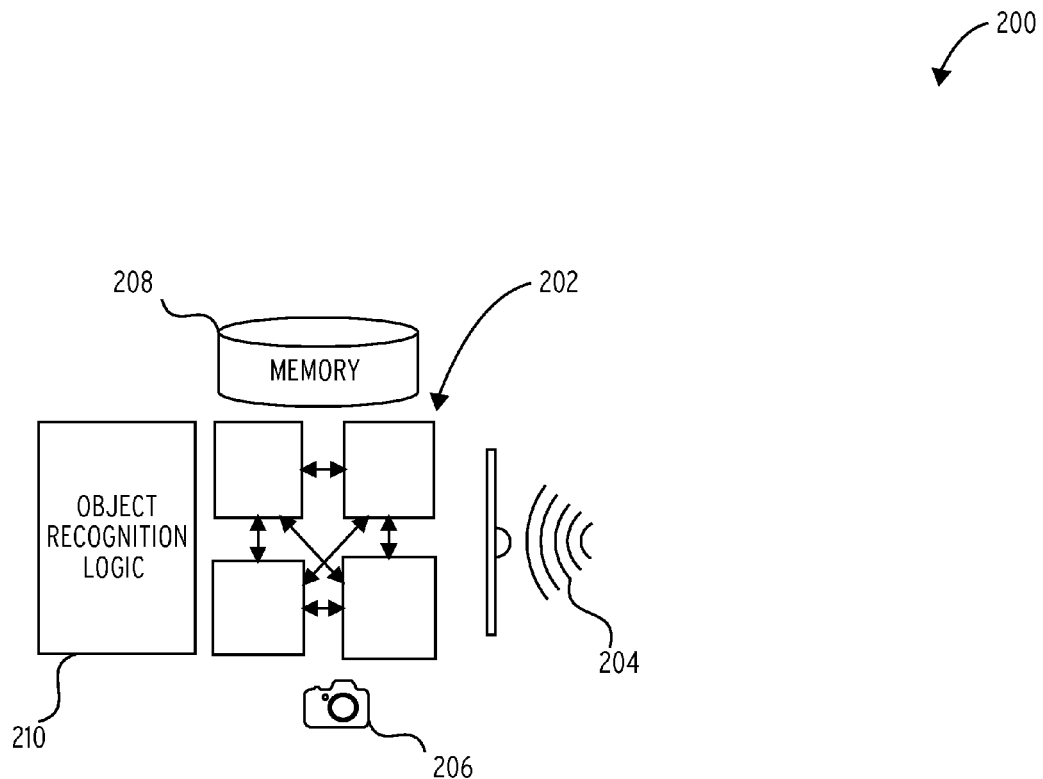
FIG. 2 illustrates an embodiment of a sensor node 200.

FIG. 2 illustrates an embodiment of a sensor node 200. The sensor node 200 comprises a processor array 202, a memory 208, a network communication interface 204, object recognition logic 210, and one or more camera 206. The sensor node 200 may further comprise additional types of sensors and transducers 122 not illustrated in this example. For example, some embodiments of the sensor node 200 may comprise speakers, microphones, temperature sensors, a GPS (Global Positioning System) interface, a magnetometer, IR motion sensor, or an accelerometer.

Multiple of the sensor node 200 may be arranged into a "room hub", and one or more room hubs may be integrated via the bus fabric 102 with various mobile devices (see FIG. 1) and room displays to form a room cloud system 100.

The network communication interface 204 may comprise a WiFi interface, an Ethernet interface, or other network communication technology. Room hubs may be placed on table top, mounted to ceilings, walls, mounted next to a flat screen or otherwise located in a room. Within the room hub, multiple sensor node 200 devices form a redundant array of processing elements with a bus based on serial protocols such as USB or Thunderbolt. One or more of the sensor node 200 may utilize USB charging. Each sensor node 200 of the room hub comprises its own processor array 202 and memory 208 and operates independently of the other sensor nodes in the room hub. The bus fabric 102 is hot-swappable, so a sensor node 200 may be replaced or removed or added without interrupting operation of the room cloud system 100.

When a sensor node 200 is brought "online" (turned on or added into the room cloud system 100), it may communicate a manifest of its components to the master control 124. The master control 124 may then allocate data processing and other tasks to the sensor node 200.

The memory 208 may comprise RAM, ROM, flash, and other types of read-write memory technology. The memory 208 may also comprise a high-capacity storage such as a hard drive or solid-state drive. The processor array 202 may comprise one (typically, more than one) a high performance processor (e.g., Intel class vs ARM) that comprises a GPU (graphics processing unit). The master control 124 includes the processor array 202 in the GPU pool 120 of the room cloud system 100. The processor array 202 may be utilized by the object recognition logic 210 for rendering and image analysis, for example to recognize faces, whiteboards, or an interactive display 302.

Figure 3:
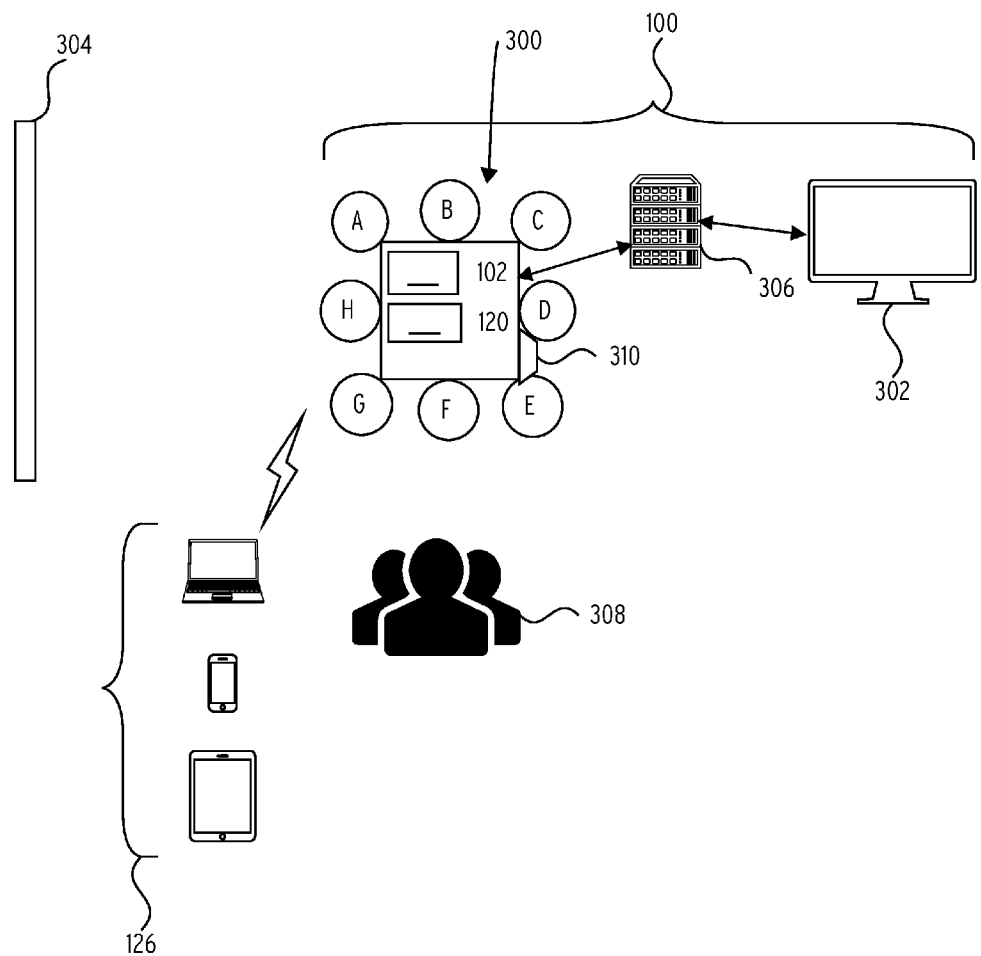
FIG. 3 illustrates an embodiment of a room hub 300 utilized in a room cloud system 100.

FIG. 3 illustrates an embodiment of a room hub 300 utilized in a room cloud system 100. The room hub 300 comprises elements of the room cloud system 100 including all or part of the bus fabric 102 and GPU pool 120. The room hub 300 may interface to a server 306 that comprises the master control 124 and membership controller 104. The server 306 may interface to an interactive display 302 visible to all of the meeting participants 308 and may be monitored for activity (e.g., user actions and changes to the display surface) by the room hub 300. A whiteboard 304 may also be visible to the meeting participants 308 and may be monitored for activity by the room hub 300.

In one embodiment the room hub 300 comprises 8-16 sensor node 200 devices. These may comprise 6-12 normal focus cameras with 120 degree field of view (FOV) to provide a high resolution surround image in a redundant configuration so that several of the sensor node 200 devices can fail and still maintain a 360 degree view as well as allowing distance detection for cameras that view the same object. In some embodiments the 200 devices vertically align the cameras to provide more redundancy. The sensor node 200 array may be designed to be maximally redundant by arranging them in a honeycomb pattern. The cameras may operate in HDR and super-resolution mode, operating with different exposures to handle the wide exposure latitudes in many rooms. In one embodiment 2-4 wide angle cameras provide a 180 degree view with IR (infrared) sensing to detect motion and other events in the room, and to operate at a lower power consumption mode. In some embodiments one or more sensor node 200 devices comprise laser detection or other precise 3D imaging technologies for distance analysis as well as IR sensing for low light.

The room hub 300 may comprise a location/orientation sensor 310 that enables the room hub 300 to be positioned in any orientation. Absolute orientation and position may be determined using accelerometers, magnetometers, and/or GPS.

The room hub 300 may utilize sensor node 200 devices forming a redundant array of inexpensive cameras to increase fault tolerance and to also increase resolution, exposure latitude, distance calculation and other features. In one embodiment a "top" (highest elevation) of the room hub 300 comprises a 4-ring of wide angle lens sensor node 200 devices, providing a failover limit of one (1). Any camera can fail and the system continues to operate a camera in low definition with wide angle view. In one embodiment the room hub 300 comprises a stacked pair of 4-ring sensor node 200 devices. Any particular point in a 360 view of the room is covered by three cameras. This gives us stereo parallax and also 1-camera redundancy to stereo vision.

The described arrangements of the sensor node 200 devices in the room hub 300 provides super-resolution, real-time HDR. With variable focus cameras the system may enable stacked focus. For even more resolution the system can trade stereo vision and redundancy for resolution. The more rings of sensor node 200 devices that are provided on the room hub 300, the more capabilities may be enabled. So we can use the same trick and the software gets simpler. The room cloud system 100 may scale to utilize very large camera arrays. In one embodiment one or more ring of sensor node 200 devices comprises cameras with zoom lenses, each providing a 30 degree field of view.

Figure 4:
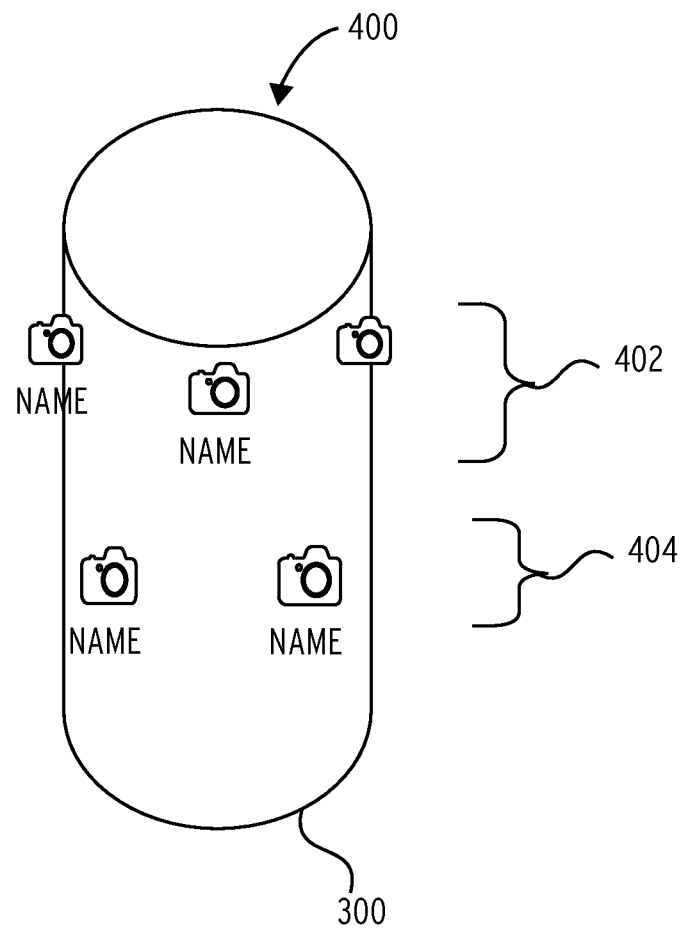
FIG. 4 is a front view illustration of a room hub utilizing four cameras per ring 400.
Figure 5:
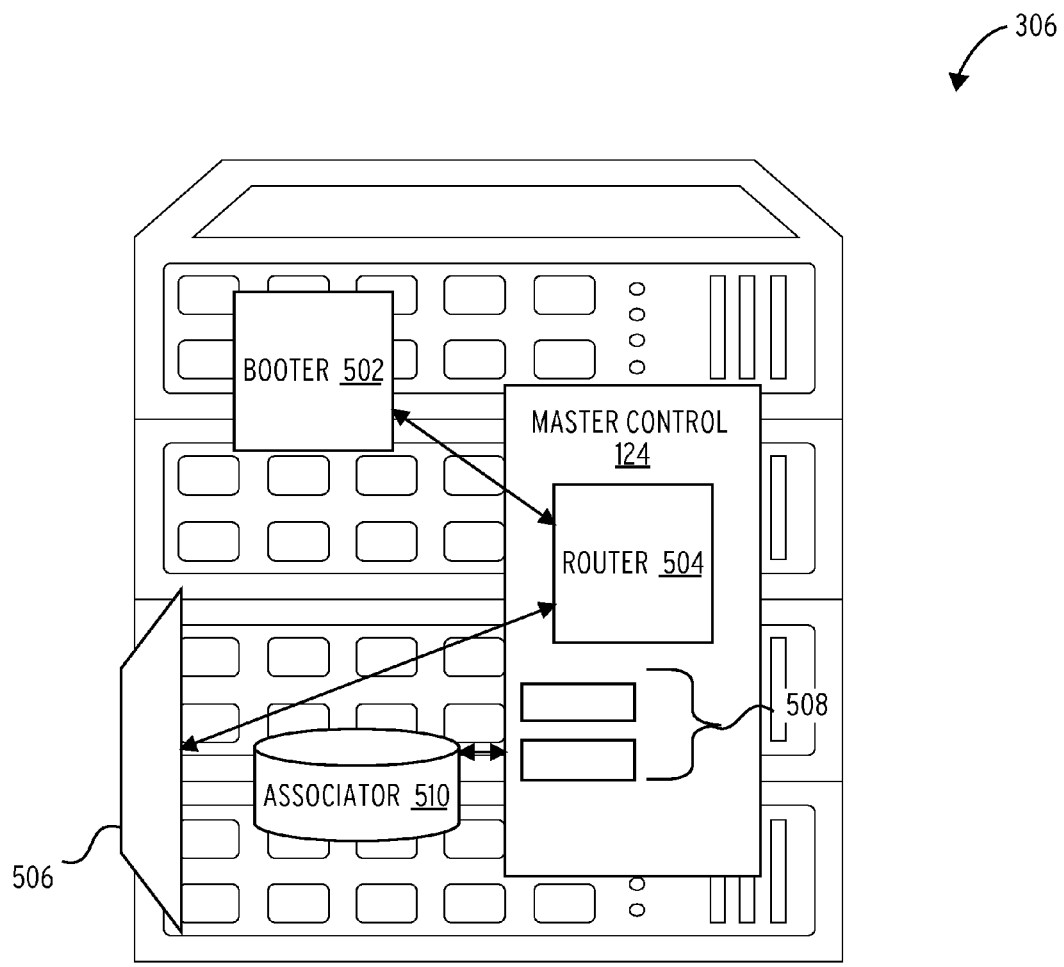
FIG. 5 illustrates an embodiment of a server 306.

FIG. 4 is a front view illustration of a room hub utilizing four cameras per ring 400.

In the room hub utilizing four cameras per ring 400, N=4, and each of two rings of four camera devices (e.g., sensor node 200 device) are offset from one another horizontally around a periphery of the room hub 300. An upper ring 402 has a first peripheral layout, and a lower ring 404 has a second horizontal layout horizontally and vertically offset from the first horizontal layout. Thus if the upper ring 402 has sensor node 200 devices at 0 degrees, 90, 180 and 270, then the lower ring 404 has sensor node 200 devices offset at 0+45, 90+45, 180+45 and 270+45 (for example). A third ring, if present, may be offset from both of the upper ring 402 and the lower ring 404, for example with sensor node 200 devices at 22.5 offsets. A fourth ring, if present, might have sensor node 200 offset at 22.5+45. Thus for any given point in the room, the camera (or other sensor) coverage overlaps, providing redundancy as well as allowing multiple camera features such as HDR (high definition resolution).

In one embodiment, cameras that overlap record different exposures providing wider latitude for focus stacking. Focus stacking (also known as focal plane merging and z-stacking or focus blending) is a digital image processing technique which combines multiple images taken at different focus distances to give a resulting image with a greater depth of field (DOF) than any of the individual source images.

In some embodiments the offset rings upper ring 402 and lower ring 404 are utilized to provide stereo and distance calculations. The processor array 202 devices in each ring may operate cameras at different frame rates and different resolutions. Wide angle lenses may be operated at slow motion rates and consume less power on a per unit basis than other cameras. The wide angle cameras may be operated as "cones" for low-power visual monitoring.

Higher frame rate rings may be turned off periodically enabling the room hub utilizing four cameras per ring 400 to efficiently manage power by changing the resolution and frame rates of cameras that are turned on. Each of the sensor node 200 devices may be periodically "rebooted" (full power on reset) in a sequence that advantageously utilizes redundancy of view coverage at all times. Counterintuitively, these periodic full resets of the sensor node 200 devices may actually increase system availability and coverage.

illustrates an embodiment of a server 306. Although illustrated in the provided examples as a separate component/device, in some embodiments the server 306 may be implemented in each of the room hub 300 devices.

When a room hub 300 initiates operation, it communicates with the network interface 506 of the server 306 to interface with the router 504. The router 504 handles DHCP and other requests from the sensor node 200 devices of the room hub 300 and then boots them from its own cache via operation of the booter 502. The master control 124 operates the router 504 to provide a set of real-world object associated queues 508 that are published to all sensor node 200 devices in the system and also potentially to other devices in the room cloud system 100 such as the interactive display 302.

From an application perspective, the real-world object associated queues 508 are not "feeds" in the traditional sense of a data stream from a source sensor device such as a video camera. Rather, the real-world object associated queues 508 are associated with named program objects identified by the object recognition logic 210 of the various sensor node 200 devices in cooperation with the master control 124 and object pattern associator 510 (each of which may be components of the room hub 300), or named explicitly by users of the room cloud system 100 (e.g., meeting participants 308).

The sensor node 200 devices may post information to these message queues and they may also receive commands from control queues. This enables the room cloud system 100 with robust operation and allows sensor node 200 devices to cleanly fail over because the queue names are published throughout the room cloud system 100 and fail over elements may subscribe to the queues.

A public and subscribe model may be utilized enabling patterns such as router/dealer in systems such as Zeromq for redundancy and high performance. There may be multiple room hub 300 devices in the same room and they may interoperate to provide overlapping field of view and sensing information using the described queuing system.

Room hub 300 devices may be in physically distinct locations from one another to support distributed meetings while interoperating over the Internet or a LAN (local area network) or WAN (wide area network). The room hub 300 devices may utilize a HTTP (hypertext transfer protocol)/SSL (secure sockets layer) web socket to each other for security and easy scale across a variety of network systems.

Figure 6:
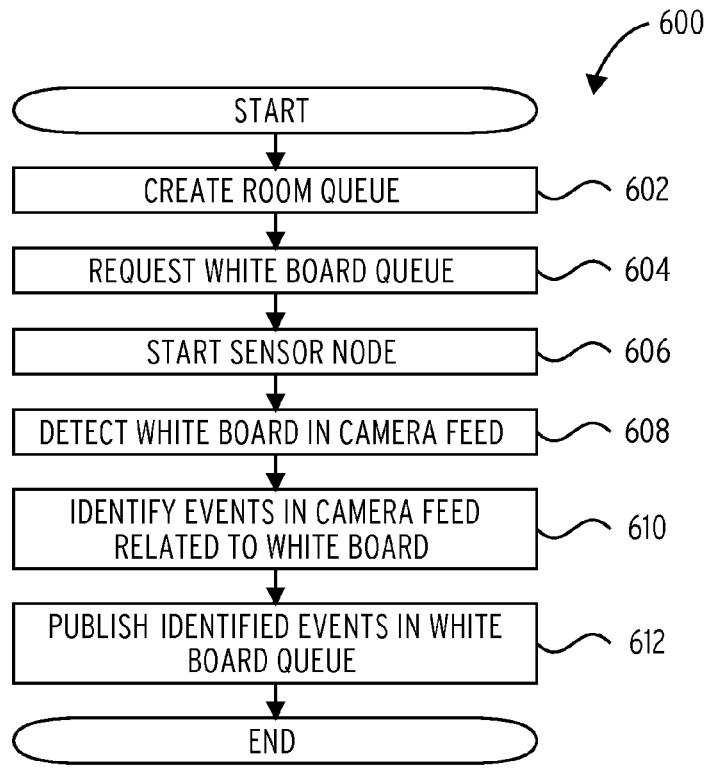
FIG. 6 illustrates an embodiment of a process of operating a room conference system 600.

FIG. 6 illustrates an embodiment of a process of operating a room conference system 600. Applications listen and consume named real-world object associated queues 508, process the contents and then push results onto other queues. The process of operating a room conference system 600 embodiment illustrates how the system might track white board activity.

The master control 124 interoperates with the router 504 to establish a "Room Queue" at block 602. This is a queue utilized to configure requests for sensor data from applications and sensor node 200 devices. When a process want to track the "white board" object in the room (a physical whiteboard 304 object), at block 604 publishes a request to the Room Queue requesting the location of the "white board" in room coordinates (parametrically, an object that is right now on the side wall, it is white, etc.) and indicating the events from this object for which to receive notifications (e.g., a new annotation, or changing to the "white board" as the object represented on the interactive display 302). Unlike conventional techniques, this embodiment of operation does not identify the source process or device for messages in the queue, nor is a graph of interaction generated a priori. The room cloud system 100 may be a fundamentally unreliable system, with unpredictable participants or available sensor node 200 devices.

The system establishes a "white board queue" where events related to the white board are published.

When a sensor node 200 device is started at block 606 (e.g., turned on or reset), it subscribes to the room request queue. It then receives messages from the queue representing requests, and determines if it can fulfill those requests. Each camera takes in these requests and maintains a table of which object queues are open and require data.

At block 608 the sensor node 200 detects the white board object in its camera feed, based on the parametric description in the room queue, and begins identifying events related to the white board at block 610. These events are published in the white board queue at block 612 for consumption/listening by processes or other sensor node 200 devices interested in white board events.

Queues are associated with physical things in the room. There may exist a white board queue, an interactive display queue, a "John Smith" queue that tracks actions by a participant identified by that name, there may exist an "Unknown Subject that just entered the room queue", and so on.

Cameras with a view of the white board publish updates to the "white board queue". There may be no notion of constant frames per second. Processors subscribe to these object queues. They wait for input, they don't know where the input is coming from or if they get everything and some of the information is definitely wrong. However the object queue provides a single place for processes to wait on events about a particular proximate physical object, regardless of the source of those events.

In one embodiment each sensor node 200 measures its relative attitude (e.g., orientation to the ground and magnetic north) to determine which direction its associated camera device is facing. Each sensor node 200 device is to some extent autonomous, comprising a processor, memory, and resident object processing logic. The queues themselves may be redundant and configured to enable models such as router/dealer.

In one embodiment multiple room hubs interoperate to create a distributed meeting room environment. A master queue started by the first room hub to start up. This is detected by other room hubs which all subscribe. If the master goes down, it is just another publisher because fundamentally a queue lives in the network as a TCP/IP address with a socket and fail-over works as it does with all TCP/IP devices. Multi room conferences are enabled by applications that can subscribe to queues from room hubs in different rooms. Storing information ("conference logging") is enabled by reading information from a queue and writing it into persistent storage. This enables storage of information both in the cloud and in the room itself.

For security, messages in a queue may be encrypted with the subject (e.g., the proximate physical object represented in the queue) key and owner key so that only processors with the right key can read and interpret the messages. This provides an efficient means to implement privacy-enhanced processing.

A text data logging process may listen to queues and creates its own queues with strictly textual data in it. These may be aggregated as well in reduce phases. Requests for information can go to either dedicated logging queues or to the general room queue.

Facial recognition may be implemented by publishing requests to identify faces encoded in queues to a cloud computing infrastructure, for example one implementing Large Scale Neural Networks and Artificial Intelligence.

Figure 7:
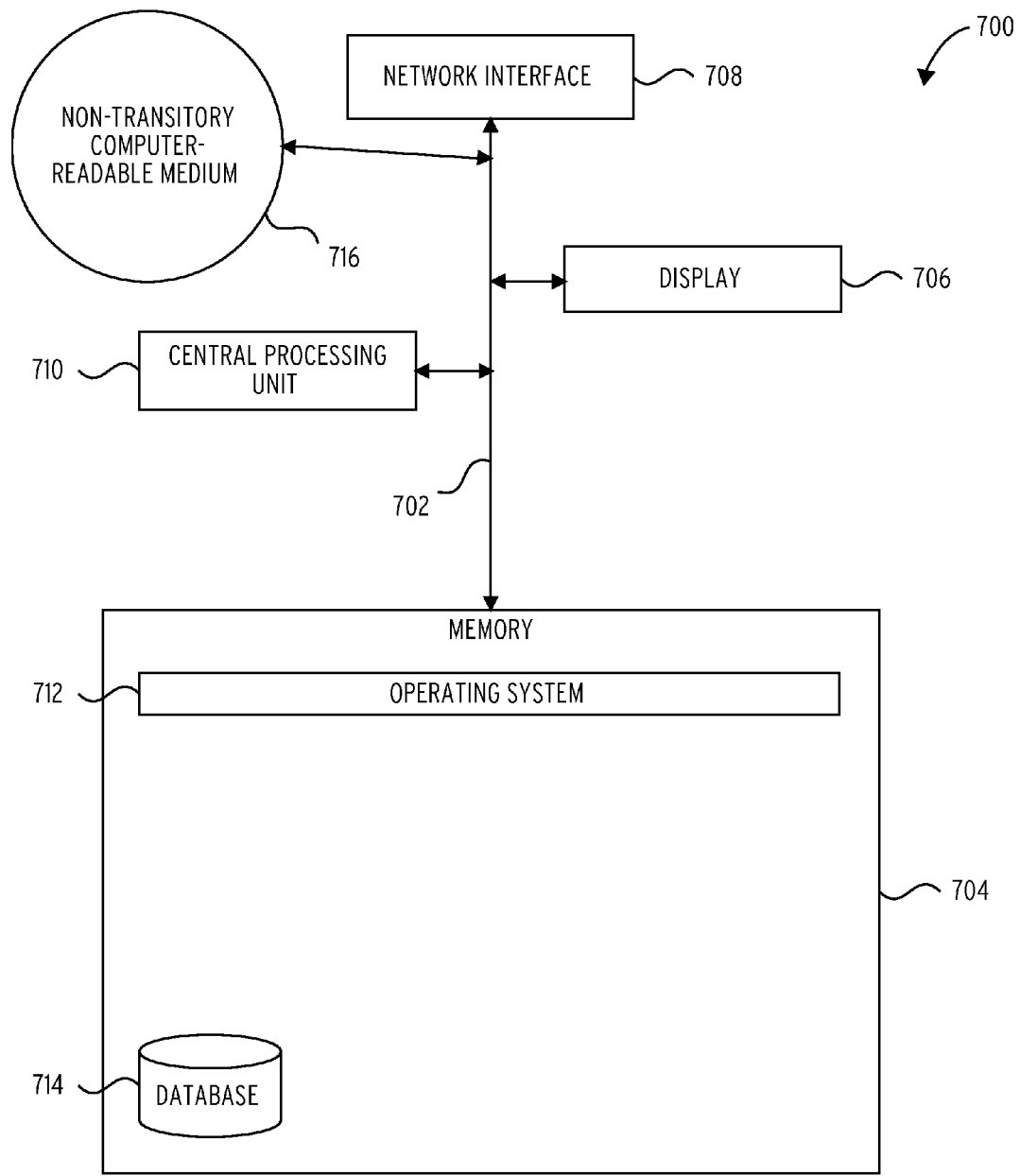
FIG. 7 illustrates a server 700 in accordance with one embodiment.

FIG. 7 illustrates several components of an exemplary server 700 in accordance with one embodiment. In various embodiments, server 700 may include a desktop PC, server, workstation, mobile phone, laptop, tablet, set-top box, appliance, or other computing device that is capable of performing operations such as those described herein. In some embodiments, server 700 may include many more components than those shown in FIG. 7. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, server 700 may comprise one or more physical and/or logical devices that collectively provide the functionalities described herein. In some embodiments, server 700 may comprise one or more replicated and/or distributed physical or logical devices.

In some embodiments, server 700 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Server 700 includes a bus 702 interconnecting several components including a network interface 708, a display 706, a central processing unit 710, and a memory 704.

Memory 704 generally comprises a random access memory ("RAM") and permanent non-transitory mass storage device, such as a hard disk drive or solid-state drive. Memory 704 stores an operating system 712.

These and other software components may be loaded into memory 704 of server 700 using a drive mechanism (not shown) associated with a non-transitory computer-readable medium 716, such as a floppy disc, tape, DVD/CD-ROM drive, memory card, or the like.

Memory 704 also includes database 714. In some embodiments, server 200 (deleted) may communicate with database 714 via network interface 708, a storage area network ("SAN"), a high-speed serial bus, and/or via the other suitable communication technology.

In some embodiments, database 714 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 8:
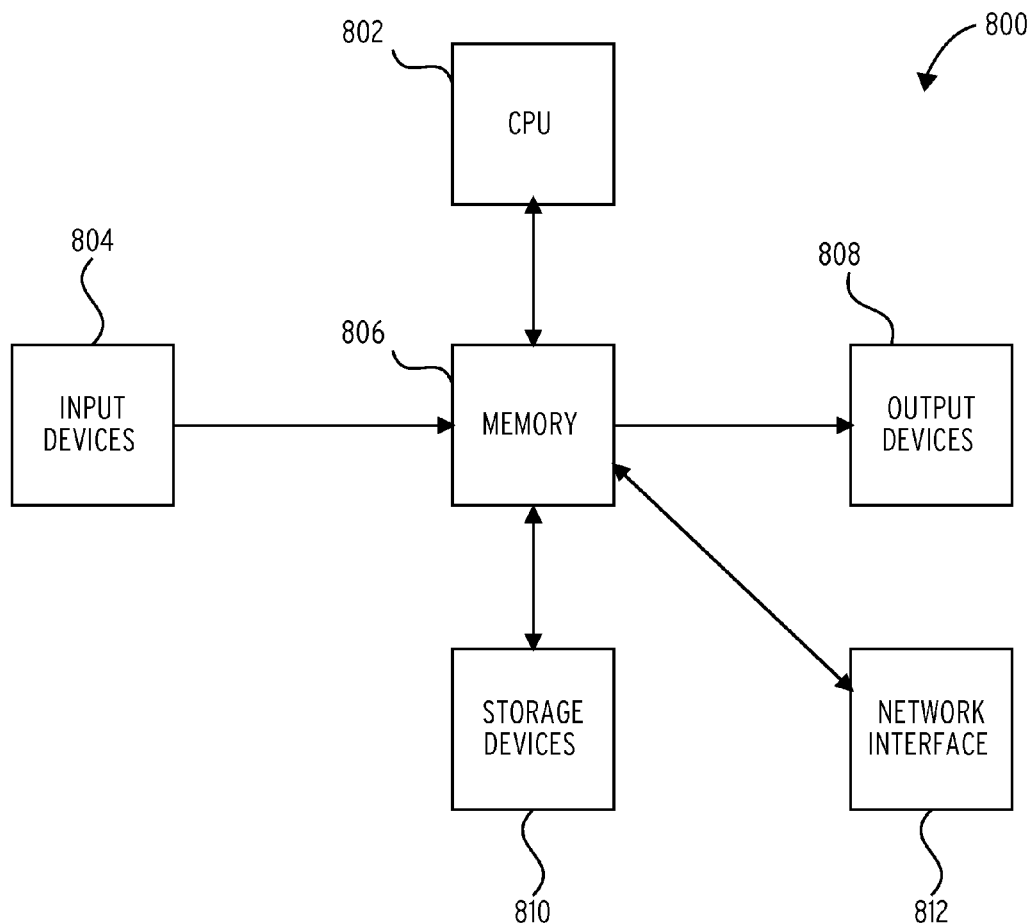
FIG. 8 illustrates an embodiment of a digital apparatus 800 to implement components and process steps of the system described herein.

FIG. 8 illustrates an embodiment of a digital apparatus 800 to implement components and process steps of the system described herein, for example to implement a sensor node 200 or a room hub 300.

Input devices 804 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 804 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 804 are provided via various machine signal conductors (e.g., busses or network interfaces) and circuits to memory 806.

The memory 806 is typically what is known as a first or second level memory device, providing for storage (via configuration of matter or states of matter) of signals received from the input devices 804, instructions and information for controlling operation of the CPU 802, and signals from storage devices 810.

Information stored in the memory 806 is typically directly accessible to the CPU 802 of the device. Signals input to the device cause the reconfiguration of the internal material/energy state of the memory 806, creating in essence a new machine configuration, influencing the behavior of the digital apparatus 800 by affecting the behavior of the CPU 802 with control signals (instructions) and data provided in conjunction with the control signals.

Second or third level storage devices 810 may provide a slower but higher capacity machine memory capability. Examples of storage devices 810 are hard disks, optical disks, large capacity flash memories or other non-volatile memory technologies, and magnetic memories.

The CPU 802 may cause the configuration of the memory 806 to be altered by signals in storage devices 810. In other words, the CPU 802 may cause data and instructions to be read from storage devices 810 in the memory 806 from which may then influence the operations of CPU 802 as instructions and data signals, and from which it may also be provided to the output devices 808. The CPU 802 may alter the content of the memory 806 by signaling to a machine interface of memory 806 to alter the internal configuration, and then converted signals to the storage devices 810 to alter its material internal configuration. In other words, data and instructions may be backed up from memory 806, which is often volatile, to storage devices 810, which are often non-volatile.

Output devices 808 are transducers which convert signals received from the memory 806 into physical phenomenon such as vibrations in the air, or patterns of light on a machine display, or vibrations (i.e., haptic devices) or patterns of ink or other materials (i.e., printers and 3-D printers).

The network interface 812 receives signals from the memory 806 and converts them into electrical, optical, or wireless signals to other machines, typically via a machine network. The network interface 812 also receives signals from the machine network and converts them into electrical, optical, or wireless signals to the memory 806.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A room conferencing system, comprising:
   a hub comprising a plurality of sensor nodes, each sensor node comprising a sensor node camera and a sensor node processor;

a master controller operable to establish a plurality of named queues, each of the plurality of named queues associated with a proximate physical object in an area comprising the hub and detectable by the sensor node camera; and each sensor node operable to cause the sensor node processor to:
   identify a viewed physical object in a feed from the sensor node camera; and
   associate the viewed physical object with one of the plurality of named queues.

2. The room conferencing system of claim 1, further comprising:
   the master controller operable to establish a master queue comprising a description of the proximate physical object.

3. The room conferencing system of claim 1, further comprising:
   the plurality of sensor nodes arranged in a plurality of rings around a perimeter of the hub.

4. The room conferencing system of claim 3, further comprising:
   the plurality of rings each comprising exactly four sensor nodes.

5. The room conferencing system of claim 3, further comprising:
   the plurality of rings each comprising exactly eight sensor nodes.

6. The room conferencing system of claim 3, further comprising:
   each sensor of a particular ring of the plurality of rings being both vertically and horizontally offset from sensors in a ring immediately above the particular ring.

7. The room conferencing system of claim 3, further comprising:
   each sensor of a particular ring of the plurality of rings being both vertically and horizontally offset from sensors in a ring immediately above the particular ring and sensors in a ring immediately below the particular ring.

* * * * *